Jan. 15, 1957   A. R. LUBERSKY   2,777,563
CARTON FORMING AND CONVEYING MECHANISM
Filed May 10, 1954   2 Sheets-Sheet 1

INVENTOR.
ALBERT R. LUBERSKY
BY
Fryer and Johnson
ATTORNEYS

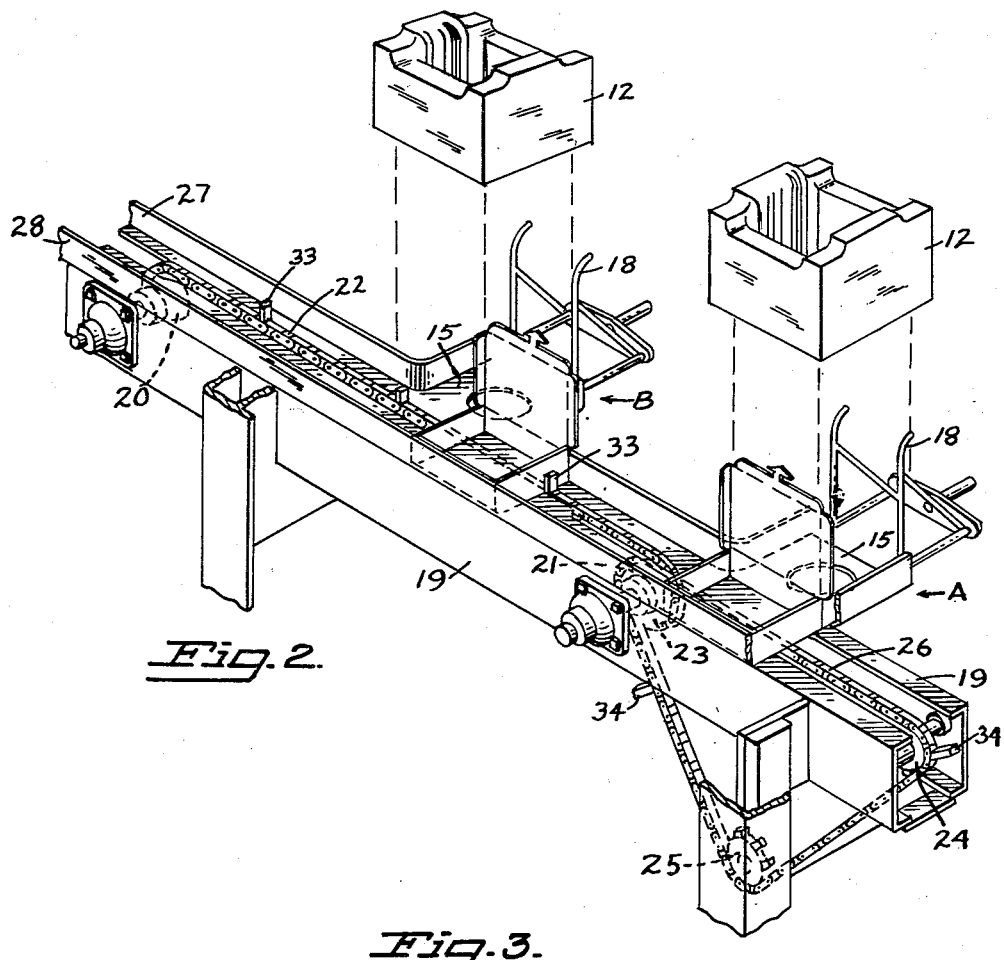

United States Patent Office 2,777,563
Patented Jan. 15, 1957

2,777,563

CARTON FORMING AND CONVEYING MECHANISM

Albert R. Lubersky, Stockton, Calif., assignor to Fibreboard Products Inc., San Francisco, Calif., a corporation of Delaware Application May 10, 1954, Serial No. 428,493

4 Claims. (Cl. 198—34)

This invention relates to the formation and conveying of cartons or the like with particular reference to the timing and spacing of the cartons as they leave a setting up machine and are delivered to a second machine to be filled at the same rate that they are set up but at different spacing.

The problem with which the present invention is concerned arises in connection with a dual head carton setting up machine in which two cartons are simultaneously set up and transferred to a conveyor which carries them to a filling machine. The filling machine operates at a speed to handle all of the cartons set up by the dual head setting up machine but difficulty in timing arises for the following reasons. Because of mechanical considerations, the two heads of the setting up machine are spaced apart a minimum distance which for example may be given as twenty inches. These heads operate simultaneously and deliver two cartons at once onto the conveyor. Since the filling machine receives all of the cartons from the conveyor at equal time intervals, they must be positioned thereon at equal distances shorter than their original spacing which in this example happens to be nine inches.

It is, therefore, the object of this invention to provide a combination carton setting up machine and conveyor mechanism in which cartons may be delivered to the conveyor two at a time at certain spaced intervals and delivered by the conveyor to their point of destination one at a time at spaced intervals considerably shorter than said first spaced intervals.

A further object in the invention is to provide a novel conveying mechanism capable of operating at a moderate speed and of receiving articles two at a time from a direction normal to its direction of travel and of discharging said articles one at a time in evenly spaced sequence.

The present invention was developed in connection with and has special application to carton setting up machines of the kind generally disclosed in the application of William H. Wilcox, entitled "Carton Setting up Machine," filed August 31, 1953, Serial No. 377,324, in combination with carton filling machines. However as the description proceeds, it will become apparent that the conveyor mechanism herein disclosed may have many applications wherein two articles are received by a conveyor simultaneously and delivered thereby to a point where they are to be received one at a time for some further processing or manufacturing step.

Further and more specific objects and advantages of this invention are made apparent in the following specification wherein one form of the invention is described in detail by reference to the accompanying drawings.

In the drawings:

Fig. 2 is a perspective view illustrating the conveyor mechanism and the two delivery stations of the carton setting up machine; and Fig. 3 is a diagram illustrating the positions on the conveying mechanism of cartons delivered from a dual head setting up machine during the first five cycles of its operation.

Figure 1:
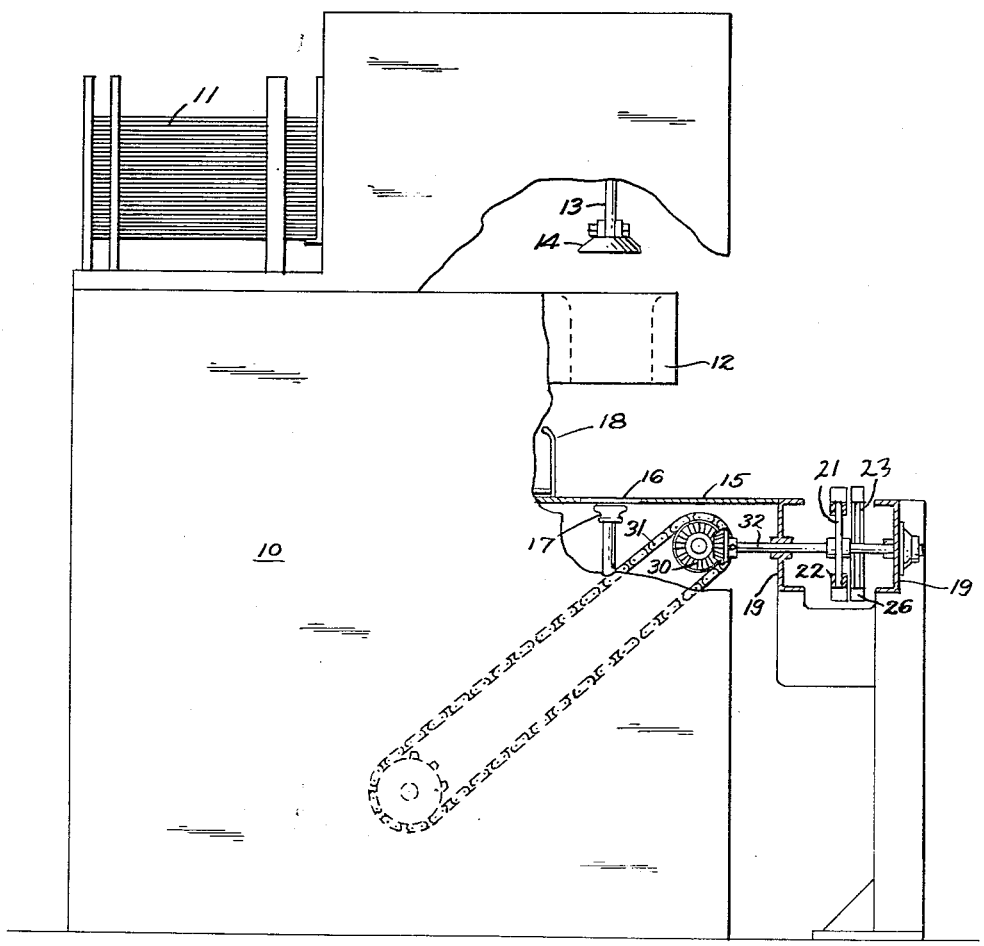
Fig. 1 is a view in side elevation of a carton setting up machine with which the present invention is associated illustrating parts of the machine and a conveyor mechanism in section.

Referring first to Fig. 1 of the drawings, the carton setting up machine therein illustrated is of the same general type as that fully disclosed in the co-pending application hereinabove referred to with the exception that it is a dual head machine forming two cartons at once. In this illustration, only those parts of the machine essential to an understanding of the present invention are illustrated. A housing 10 which contains the main drive mechanism of the machine supports a stack 11 of carton blanks in flat form which are delivered one at a time by means not shown to a carton shaping form illustrated at 12. Since this is a dual head machine, there are two stacks 11 of carton blanks and two shaping forms 12 as well as a duplication of the other elements presently to be described for forming cartons and directing them to a conveyor mechanism.

Above each of the shaping forms 12 is a plunger 13 with a platen 14 at its lower end which is advanced downwardly to press a flat blank through the form thereby causing the side and end walls of the blank to be bent upwardly and interlocked in a well-known manner. As the setup carton passes through the bottom of the form 12, it is met by the vacuum cup 17 which pulls the carton down and releases it on platform 15 while the platen 14 moves upwardly on the return portion of its cycle, a pusher 18 is advanced to slide the carton onto a conveyor track formed by the top surfaces of a pair of opposed channel members 19 between which carton advancing chains operate.

In Fig. 2 of the drawings, the conveyor mechanism is illustrated in its association with the two delivery stations A and B of a forming machine of the kind illustrated in Fig. 1. In this figure, the conveyor track formed by the channels 19 is illustrated as housing suitable sprockets 20 and 21 for a main conveyor chain 22 and sprockets 23, 24 and 25 for an auxiliary conveyor chain 26. Suitable rail members 27 and 28 confine the cartons to their proper paths as they are delivered from the forming machine and carried along the conveyor track.

With the dual head carton forming machine in operation, two cartons are simultaneously formed at stations A and B deposited upon the platforms 15 and simultaneously advanced by the pushers 18 onto the conveyor track where the carton at station A is disposed over the auxiliary chain 26 while the carton at station B is disposed over the main chain 22. Now, as previously explained, the cartons assume a position about twenty inches apart center to center though it is desirable that they be advanced by the chain 22 toward the left as viewed in Fig. 2 at a spacing of nine inch centers at which spacing they are delivered to filling or other processing machinery not shown. The main chain 22 may, of course, be as long as required for this purpose. To accomplish this, the chains 22 and 26 are driven at the same speed through a drive shown in Fig. 1 which includes a pair of bevel gears 30 in the setting up machine, one being driven through a chain 31 from the main drive of the machine and the other being on a sprocket shaft 32 which carries the sprockets 21 and 23 for both of the chains 22 and 26. The main chain 22 has driving lugs 22 thereon spaced at intervals corresponding to the spacing at which the filling machine or the like is to receive the cartons which in the present instance is nine inches. Similar drive lugs 34 on the auxiliary chain 26 are spaced at twice these intervals or eighteen inches.

The chains are timed to move eighteen inches during each cycle of operation of the carton forming machine.

Because of the spacing of the lugs on the main chain and on the auxiliary chain and the timing of the chains with the delivery cycle of the forming machine the cartons, though delivered to the conveyor at twenty inch centers, are carried away by the conveyor at nine inch centers as is most clearly illustrated in Fig. 3. In this figure the horizontal bands 1 to 5 illustrate the conveyor during the first five cycles of machine operation and the letters A and B represent the positions of the cartons delivered at stations A and B of Fig. 2. Thus in the first cycle, cartons A1 and B1 are delivered in the position shown in the first horizontal band of Fig. 3. The conveyor moves continuously between cycles so in the second cycle carton B1 has been moved two spaces by the lug 33 on the main chain which engages it but carton A1 has moved only one space or to the position between the stations A and B because of the greater spacing between the lugs on the auxiliary chain which permits carton A to remain stationary during the first half of the time between cycles. Thus upon the second cycle of the carton forming machine, spaces remain open on the conveyor for the reception of cartons A2 and B2. During the third cycle, cartons A3 and B3 may be deposited in the same open spaces because A2 has advanced one space while B2 has advanced two spaces. Progressing in the same manner through the fifth cycle, as illustrated in Fig. 3, the conveyor is loaded to capacity with cartons advancing at the shorter spacing even though they continue to be delivered to the conveyor at the greater spacing. Belts or other flexible media may be used instead of the conveyor chains herein disclosed and the term "chain" as used in the claims is intended to include such equivalents.

I claim:

1. A device for combination with a machine for forming cartons or the like two at a time and a conveyor track for directing the cartons away from the machine which comprises means to move the cartons two at a time onto the conveyor track normal to the direction of their movement thereon and in spaced relationship, means to advance the leading carton on the conveyor track at a certain speed, and a second means to advance the other carton at the same speed but at a later time to change the spaced relationship of the cartons on the conveyor track.

2. A device for combination with a machine for forming cartons or the like two at a time and a conveyor track for directing the cartons away from the machine which comprises means to move the cartons two at a time onto the conveyor track normal to the direction of their movement thereon and in spaced relationship, a chain with spaced lugs thereon to advance the leading carton on the conveyor track, a second chain having lugs at greater spacing to advance the other carton to a position for engagement by the lugs of the first chain, and means for driving the chains at the same speed whereby the said other carton may be delayed in its forward movement to provide space on the conveyor for reception of the next two cartons in place of the first two.

3. A conveyor for cartons or the like which comprises a track upon which cartons may slide, two receiving stations spaced on said track for simultaneous reception of two cartons, a main chain underlying the leading station and having carton moving lugs at intervals shorter than the space between said stations, an auxiliary chain underlying the other station with carton moving lugs at intervals twice the length of those on the main chain, said auxiliary chain being arranged to move cartons to a position for engagement by the lugs on the main chain, and means for driving the chains at the same speed.

4. A conveyor for cartons or the like which comprises a track upon which cartons may slide, two receiving stations spaced on said track for simultaneous reception of two cartons, a first carton advancing mechanism underlying the leading station and having carton engaging elements at intervals shorter than the space between said stations, a second carton advancing mechanism underlying the other station with carton engaging elements at intervals equal to two of the intervals on the first carton advancing mechanism, said second advancing mechanism being arranged to move cartons to a position for engagement by the engaging elements on the first such mechanism, and means for driving said first and second mechanisms at the same speed.

References Cited in the file of this patent

UNITED STATES PATENTS

| | | |
|---|---|---|
| 2,535,859 | McPherson | Dec. 26, 1950 |
| 2,600,878 | Jensen | June 17, 1952 |